US007260453B2

United States Patent
Poier et al.

(10) Patent No.: US 7,260,453 B2
(45) Date of Patent: Aug. 21, 2007

(54) CHECKLIST ERROR MITIGATION SYSTEM

(75) Inventors: James A. Poier, Snohomish, WA (US); Bradley J. Mitchell, Snohomish, WA (US); Jeffrey L. Aimar, Seattle, WA (US)

(73) Assignee: The Boeing Company, Chicago, IL (US)

( * ) Notice: Subject to any disclaimer, the term of this patent is extended or adjusted under 35 U.S.C. 154(b) by 100 days.

(21) Appl. No.: 11/030,478

(22) Filed: Jan. 6, 2005

(65) Prior Publication Data

US 2006/0149439 A1  Jul. 6, 2006

(51) Int. Cl.
*G06F 7/00* (2006.01)
*G09G 5/00* (2006.01)

(52) U.S. Cl. .......................... 701/1; 244/194
(58) Field of Classification Search ............ 701/1, 701/3, 14, 29, 31, 35; 244/194, 220, 221; 340/945, 438, 963
See application file for complete search history.

(56) References Cited

U.S. PATENT DOCUMENTS

| 4,970,683 | A  | * | 11/1990 | Harshaw et al. ............ 715/841 |
| 5,016,147 | A  | * | 5/1991  | Voorhees ..................... 362/99 |
| 6,697,718 | B2 | * | 2/2004  | Le Draoullec et al. ....... 701/29 |
| 6,753,891 | B1 | * | 6/2004  | Chohan et al. ............. 715/790 |
| 6,826,461 | B2 | * | 11/2004 | Sinex .......................... 701/29 |
| 6,993,420 | B2 | * | 1/2006  | Le Draoullec et al. ....... 701/29 |
| 2003/0048203 | A1 | * | 3/2003 | Clary et al. ................. 340/945 |

* cited by examiner

*Primary Examiner*—Dalena Tran
(74) *Attorney, Agent, or Firm*—Wildman, Harrold, Allen & Dixon, LLP

(57) ABSTRACT

A checklist error mitigation system and method are provided to reduce the chance for error when completing a checklist. The system may receive a checklist step from an electronic or voice checklist system and highlights any switch, lever, dial or control that needs to be manipulated in completion of the checklist step. The highlighting may be accomplished by spotlighting or surface lighting.

25 Claims, 5 Drawing Sheets

CHECKLIST ERROR MITIGATION SYSTEM

FIELD OF THE INVENTION

The invention generally relates to error mitigation systems, and specifically relates to checklist error mitigation systems.

BACKGROUND

While operating large commercial aircraft with complex systems, aircrews routinely use a checklist to perform normal and non-normal procedures. Currently Federal Aviation Regulations require a minimum of two pilots for operation of such aircraft and typically, one pilot reads the procedural steps of the checklist while the other pilot performs any necessary action. The pilot reading the procedural steps monitors the other pilot's performance to ensure that the correct actions are accomplished, and to help prevent inadvertent activation of the wrong device or selection of the wrong position of a flight control or switch.

The Federal requirement for a two pilot flight deck crew is driven, in part, by this inherent back-up capability of a two pilot crew. Nevertheless, errors continue to occur in performance of checklist items, sometimes resulting in catastrophic consequences. In addition, aircraft certified for single pilot operation can not take advantage of another pilot onboard, regardless of aircraft size or complexity.

Checklist philosophy has been developed over many years of commercial, business, and general aviation and is a critical safety factor in their operation. In an effort to mitigate potential pilot errors, there is a need for systems and methods which assist either a two pilot crew or a single pilot by increasing redundancy and lowering the potential for checklist error.

Although commercial aircraft have been specifically identified, any endeavor involving complex systems and/or machinery could benefit from the invention. For example, cargo carriers, military, railroads, maritime shipping, air traffic control, manned spaceflight, power generating facilities, etc. may all benefit from the invention.

The present invention is directed to overcoming one or more of the problems or disadvantages associated with the prior art.

SUMMARY

The checklist error mitigation system and method allow a pilot to quickly and accurately identify the proper switch, lever, dial or control, called for in a checklist step, or take other action. This checklist error mitigation system may be used during any normal or non-normal checklist completion.

According to one aspect of the invention, a checklist error mitigation system may include a processor adapted to run a software program, an illumination or other highlighting device or devices, a memory accessible by the processor, a checklist stored in the memory, and a user interface. The software program may determine if any switch, lever, dial and/or control requires manipulation to complete a checklist step and wherein the processor may instruct the illumination or other highlighting device or devices to illuminate or highlight each switch, lever, dial and/or control requiring manipulation so that the required checklist action may be performed by the pilot. The software program may then monitor an external device or system for an input indicative of completion of the checklist step.

According to a second aspect of the invention, a method of mitigating errors during completion of a checklist may include receiving a first input indicating a checklist step, highlighting at least one switch, lever, dial and/or control that requires manipulation for completion of the checklist step, and receiving an second input indicative of completion of the checklist step. The first input may be provided by separate electronic checklist system or database, or an internal electronic system or database, and the second input may be provided by an external device or system.

The features, functions, and advantages can be achieved independently in various embodiments of the present invention or may be combined in yet other embodiments.

DETAILED DESCRIPTION

Figure 1:
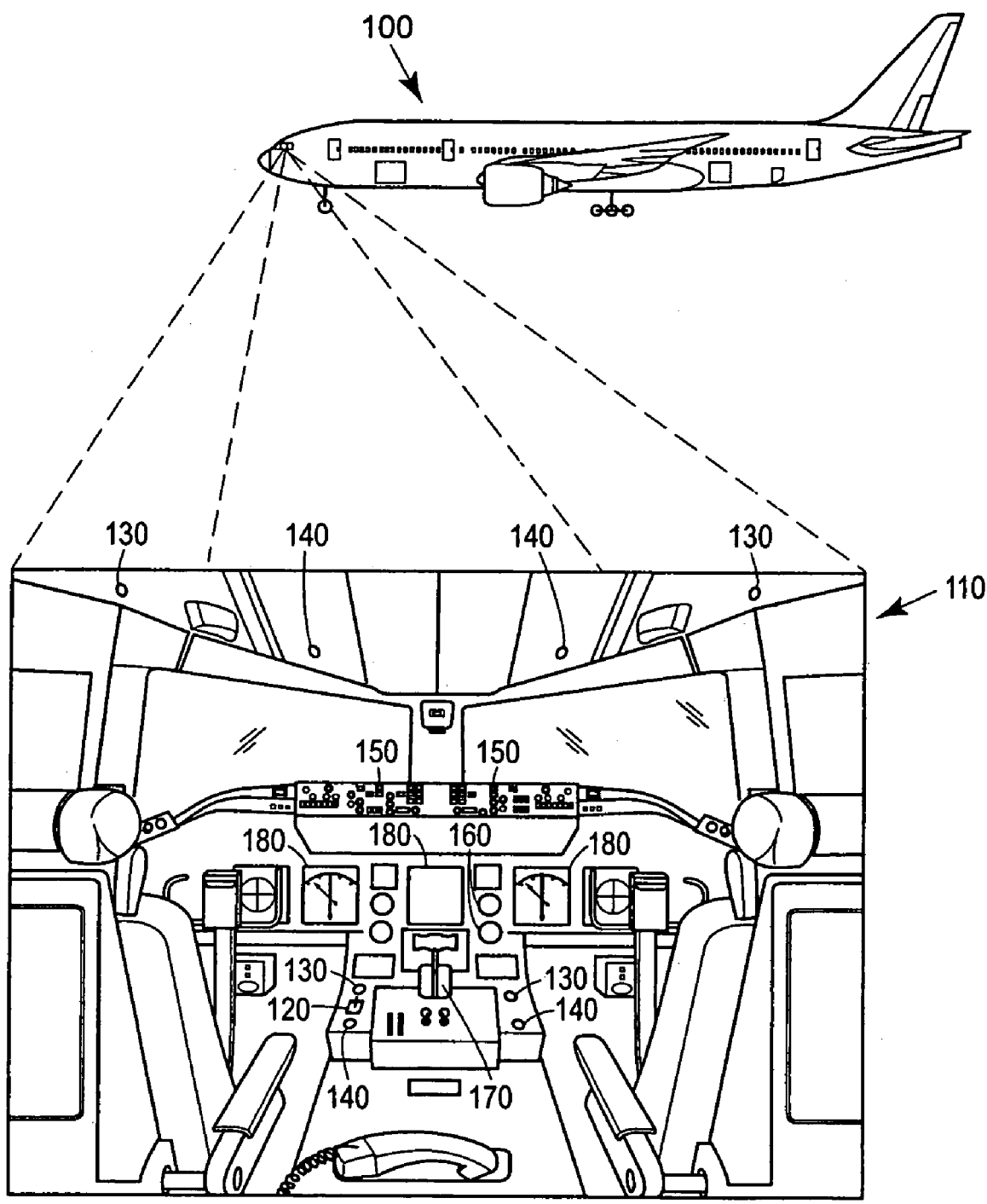
FIG. 1 shows an aircraft and one possible configuration of a system according to one exemplary embodiment of the invention on an aircraft flight deck.

Referring now to FIG. 1, an aircraft 100 includes a flight deck 110. Within the flight deck 110, a possible location for a pilot interface device 120 is shown, although any location accessible by the pilot during normal and/or emergency operations would be acceptable. It is also possible the error mitigation system may be integrated into another system such as an electronic checklist system with a suitable pilot interface in place. Additionally, several possible locations for electronic highlighting and pointing devices (130 and 140) are shown. These devices may be used to highlight switches 150, levers (not shown), dials 160 and/or controls 170. Any location which affords an uninterrupted view of the switch 150, lever, dial 160 or control 170 is acceptable. The system may be operatively connected to one or more electronic displays 180 for display of a checklist or checklist step.

Figure 2:
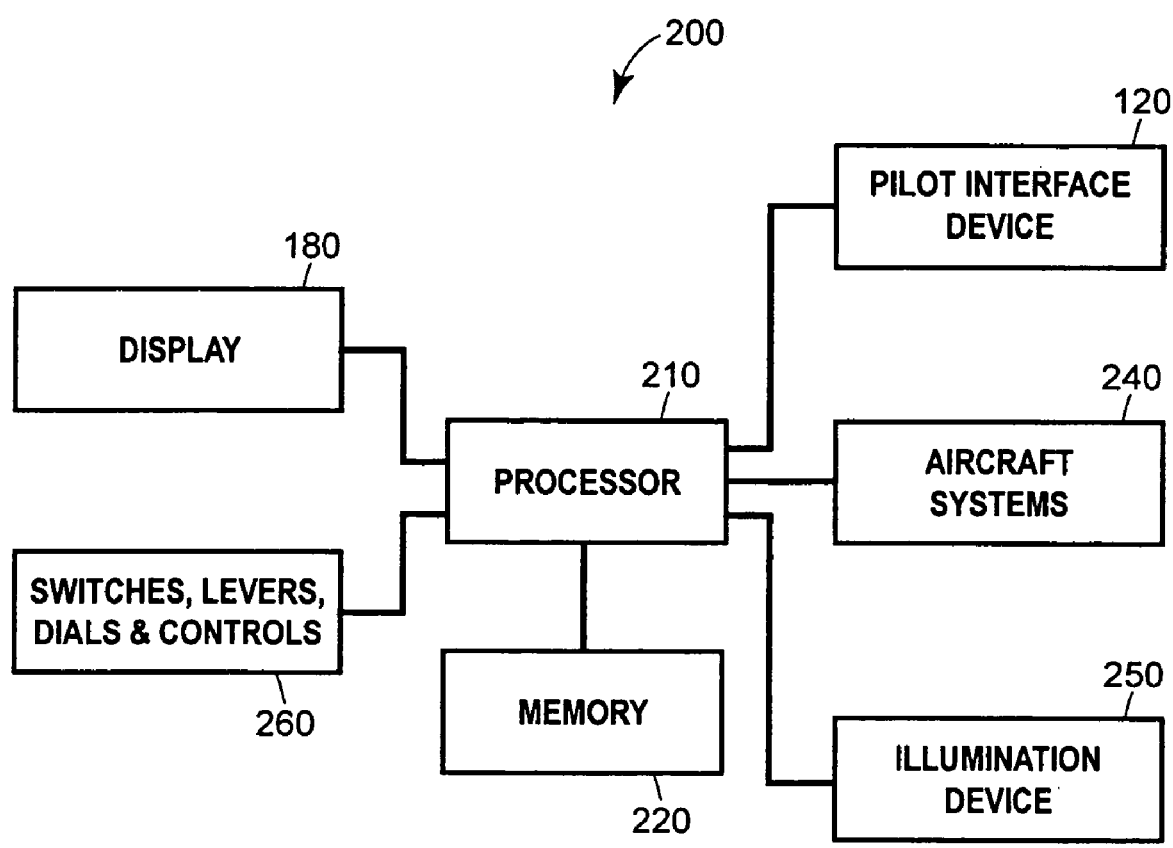
FIG. 2 is a schematic diagram of the system.

FIG. 2 is a schematic diagram of one embodiment of a checklist error mitigation system 200. The checklist error mitigation system 200 may include a processor 210 which has access to a memory 220 and a software program (not shown), executable by the processor 210 and stored within the memory 220. The processor 210 and memory 220 may be part of another aircraft system, including an electronic checklist system, or they may be separate from existing aircraft systems.

The processor 210 may be operatively connected to the pilot interface device 120 which may be used by the pilot to control and respond to a checklist. The pilot interface device 120 may be any means of enabling the pilot to control and/or respond to the checklist, such as, for example, a switch, joystick, mouse, touchscreen, touchpad or track-ball device (at a readily accessible position on the flight deck) and/or a touch screen display 180.

The checklist error mitigation system 200 may be operatively connected to an aircraft system 240 such that the checklist error mitigation system 200 may receive feedback information from the aircraft system 240.

The checklist error mitigation system 200 may enhance safe accomplishment of a checklist by enabling the pilot to quickly and reliably identify the correct switch 150, lever, dial 160 or control 170 (collectively indicated at 260 in FIG. 2) called for in the checklist. The checklist error mitigation system 200 may accomplish this task by visually identifying the correct switch, lever, dial or control 260 with an illumination device 250. In one embodiment, a spot light may be used to shine on the correct switch, lever, dial or control 260, thereby allowing the pilot to quickly and accurately identify the correct switch, lever, dial or control 260. The illumination device 250 may include one or more light sources at various locations on the flight deck 110.

The light sources may include, but are not limited to, laser diodes, light emitting diodes (LED's), or incandescent light bulbs. Enough light sources are necessary to ensure there is an unobstructed view, for at least one light source, of each and every switch, lever, dial or control 260 that may be required for accomplishment of a checklist step. Additionally, redundancy may be used to ensure that any non-stationary flight deck items, such as, for example, the pilot's arm, do not interfere with the spotlighting. Examples of spotlighting techniques are further discussed with reference to FIGS. 5 and 6.

In an alternate embodiment, surround lighting may be used instead of spot lighting. In this embodiment, each required switch, lever, dial or control 260 may be surrounded by surface lighting. Instead of light being projected upon the required switch, lever, dial or control 260, as in the spotlighting example, the light sources emanate light from an area around or within the switch, lever, dial or control 260. While this embodiment may require additional wiring to connect the checklist error mitigation system 200 to each source, the light source would not be obstructed from illuminating the switch, lever, dial or control 260 as it would be located adjacent to or within the switch, lever, dial or control 260. This embodiment may eliminate the possibility of non-stationary flight deck objects obstructing the light source. Examples of surround lighting are further discussed with reference to FIGS. 5, 7 and 8 hereinafter.

Figure 3:
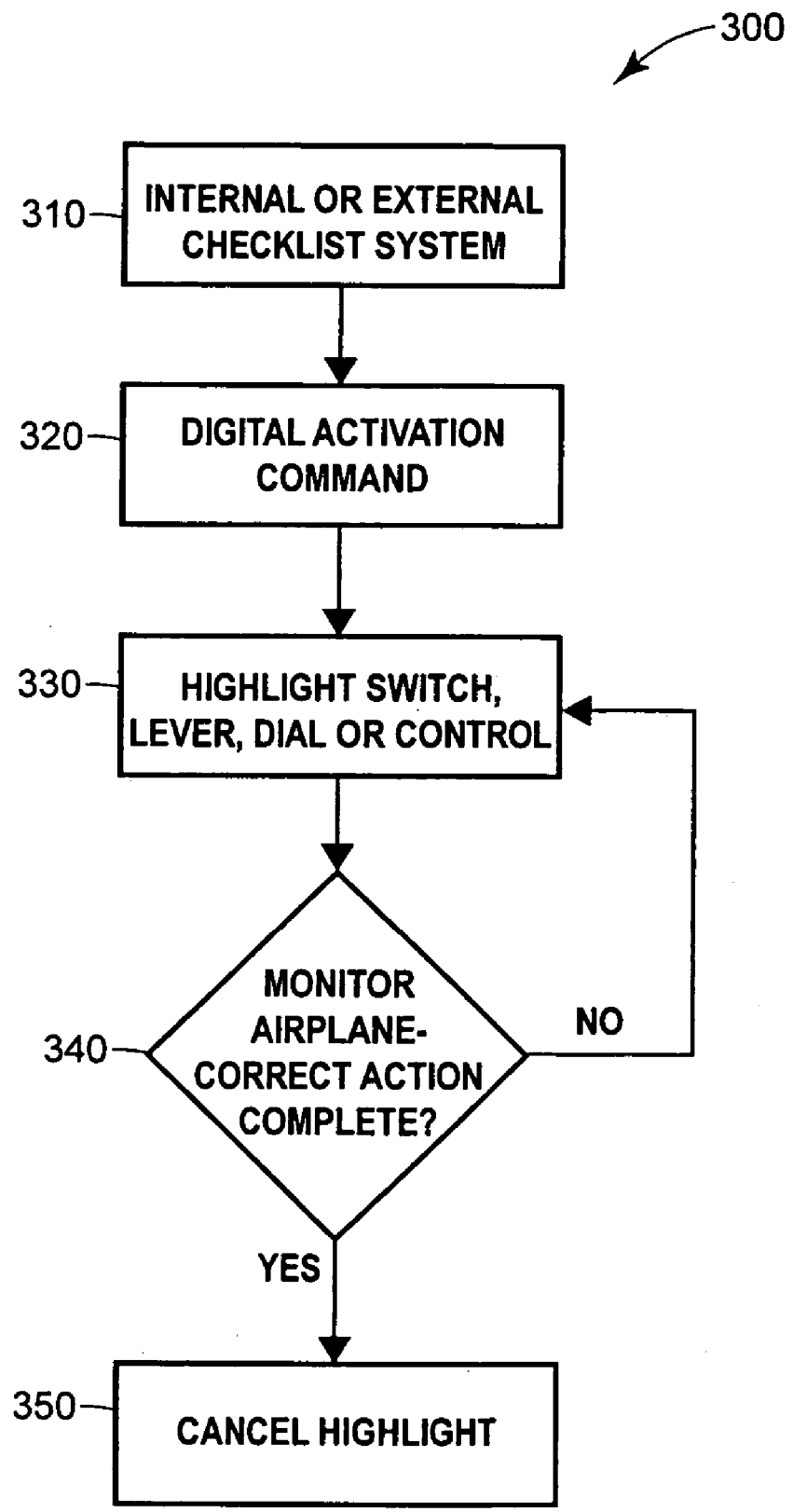
FIG. 3 is one embodiment of a logic diagram for software for the system of FIG. 1.

One embodiment of software logic 300 that may be used by the checklist error mitigation system 200 is shown in FIG. 3. The software logic 300 may begin with an input from either an internal or external electronic checklist at 310. The software logic 300 may generate a digital activation command at 320. Next, the checklist error mitigation system 200 may respond to the digital activation command at 320 by highlighting any switch, dial, lever or control at 330.

Aircraft systems 240 may be monitored at 340 for an indication that the correct checklist action is complete. If the software logic 300 cannot determine the action is complete, the software logic 300 may continue to highlight any switches, levers, dials or controls 260 as necessary. Additionally, the pilot may manually input completion of a checklist item at 340 through the pilot interface device 120. If the software logic 300 determines the correct action is complete at 340, the checklist error mitigation system 200 may turn off the control highlighting associated with the completed action at 350.

If a checklist step remains, the checklist error mitigation system 200 may accept the next digital activation command at 320 and highlight any switches, levers, dials or controls 260 as necessary. This process continues until there are no remaining checklist steps.

Figure 4:
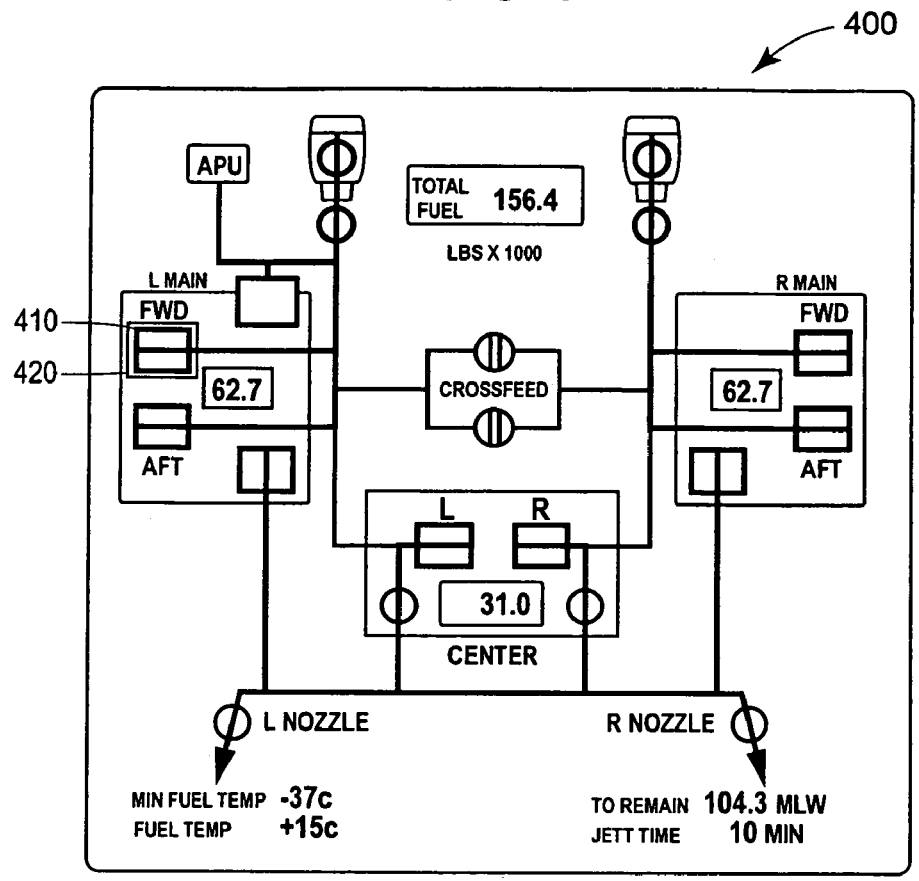
FIG. 4 is an exemplary system display on an electronic aircraft display.

FIG. 4 is an example of a fuel system synoptic 400 which may be displayed on the aircraft display 180. Displays similar to FIG. 4 may exist for many major aircraft systems and may enable a pilot to diagnose and correct system problems. The display in FIG. 4 may be a touch-sensitive type display and/or the pilot interface device 120 of the checklist error mitigation system 200 may be incorporated into such a device. The checklist error mitigation system 200 may also identify a representation 410 of the appropriate switch, lever, dial or control on such a display by enhancing its appearance. For example, the representation 410 of the switch, lever, dial or control may be ringed with a colored light 420, as seen in FIG. 4. The colored light may be any color which enhances the appearance of the representation 410 of the switch, lever, dial or control. Alternately, the representation 410 of the switch, lever, dial or control may be made larger (not shown), or the representation 410 of the switch, lever, dial or control may flash on the display screen 400. Any number of different techniques for enhancing the representation 410 of the required switch, lever, dial or control, may be used so long as the appearance of the representation 410 is enhanced.

Figure 5:
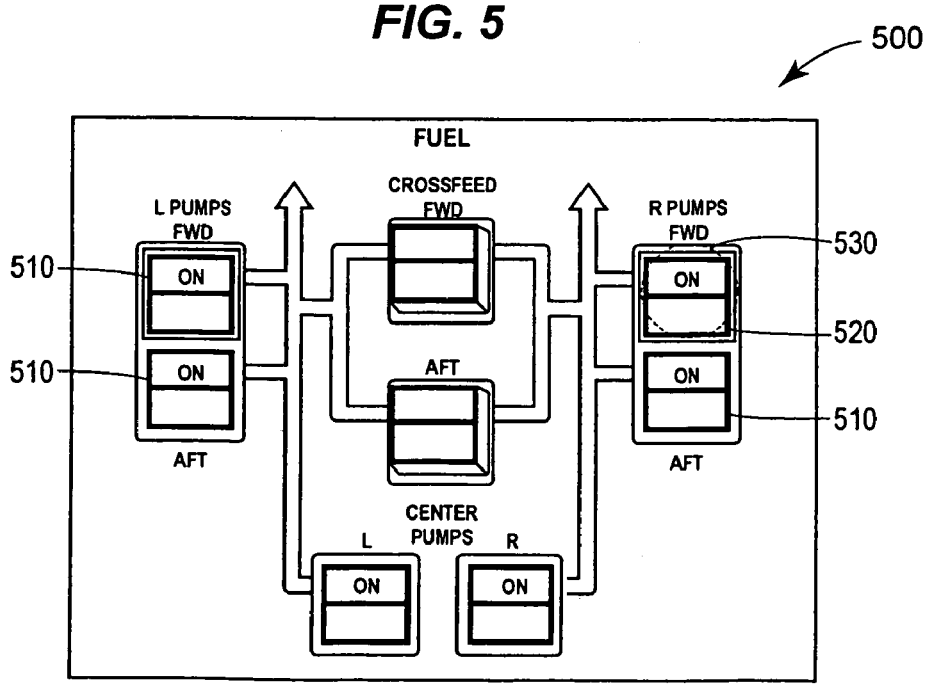
FIG. 5 is an example of surround lighting and spotlighting on an aircraft system panel.

FIG. 5 is an example of an aircraft overhead system panel 500, in this case, a fuel panel. Such a panel may include several toggle type switches 510. The right forward fuel pump switch 520 is highlighted by the checklist error mitigation system with a spotlight 530. The spotlight 530 may be generated by a laser diode, a light emitting diode and/or an incandescent bulb and be of any color. The color of the spotlight 530 in this example is red. The spotlight may be configured to highlight the switch 510 in any number of other ways other than color. For example, the spotlight 530 may flash, or otherwise draw attention to the correct switch. The user may determine how the switch, lever, dial or control may be highlighted.

Figure 6:
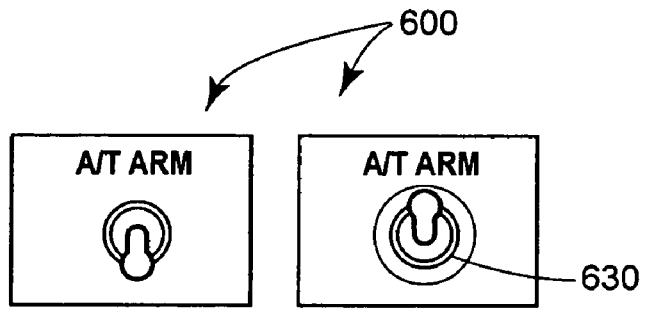
FIG. 6 is an example of spotlighting on a switch.

FIG. 6 is one example of spotlight lighting for a flight deck switch which may be used with the checklist error mitigation system 200. In the example shown, a two position switch 600 is highlighted by a spotlight, however, spotlighting may be provided for any type of switch. The left hand switch 600 is shown without spotlighting. The right hand switch 600 is shown with an example of spotlighting 630 which highlights the correct switch called for in the checklist. The spotlight 630 may be provided by any type of lighting device, such as, for example a laser diode, a light emitting diode (LED), or an incandescent light bulb. The spotlight 630 may also be of any color, the example of FIG. 6 is a red color. The spotlight 630 may be configured to highlight the switch in any number of other ways other than color. For example, the spotlight 630 may flash, or otherwise draw attention to the correct switch. The user may determine how the switch, lever, dial or control may be highlighted.

Figure 7:
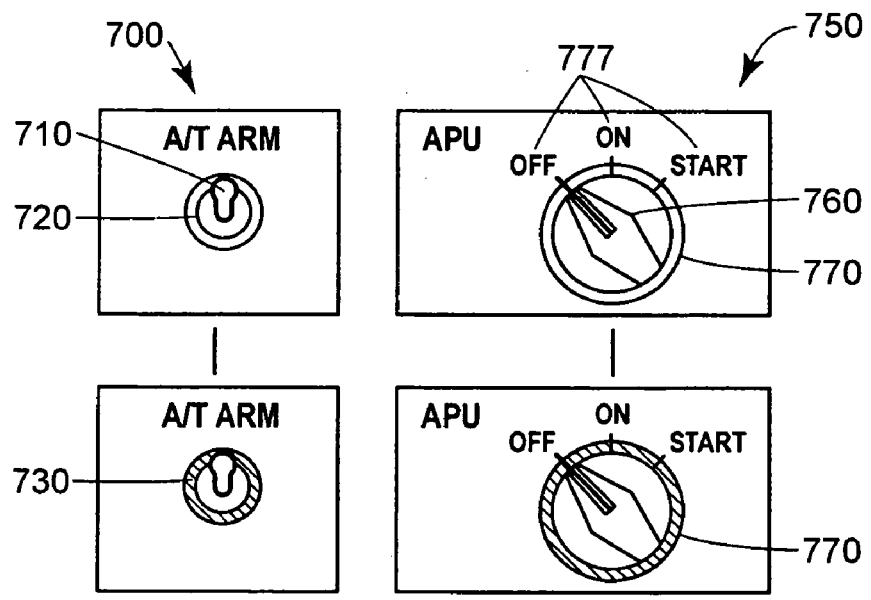
FIG. 7 is an example of surround lighting on an aircraft rotary control and a toggle type switch.

FIG. 7 is an example of surface lighting which may be used with the checklist error mitigation system 200. On the left side of the figure, a switch 700 is provided showing a toggle portion 710 and a ringed portion 720. A lighted ringed portion 730 is shown demonstrating how surface lighting may be provided for a switch. Other surface lighting techniques may be substituted for the technique depicted in FIG. 7. Any color of surface light may be provided depending on user preference. In the embodiment shown, the color of the surface light 730 is red. Additionally, as discussed above in reference to spotlighting, the lighted ringed portion 730 may identify the switch in any number of other ways; for example, the lighted ringed portion 730 may flash or blink to identify the switch. Another method of highlighting a switch such as this is to construct the toggle portion of the switch with a material that "glows" or can be illuminated from, for example, a fiber optic source.

On the right side of FIG. 7, a rotary switch or dial 750 is shown. The dial has a center portion 760, a ringed portion 770 and a plurality of position settings 777. The bottom right example in FIG. 7 demonstrates, in a similar manner to the switch 700 discussed above, how the ringed portion 770 may be illuminated. Again, the ringed portion 770 and/or the position settings 777 may be lit with any color depending on user preference, and may be highlighted in a number of other ways, such as flashing or blinking. Also similar to the switch discussed above, the center portion 760 of this switch may also be constructed with a material that "glows" or can be illuminated from a fiber optic source.

Figure 8:
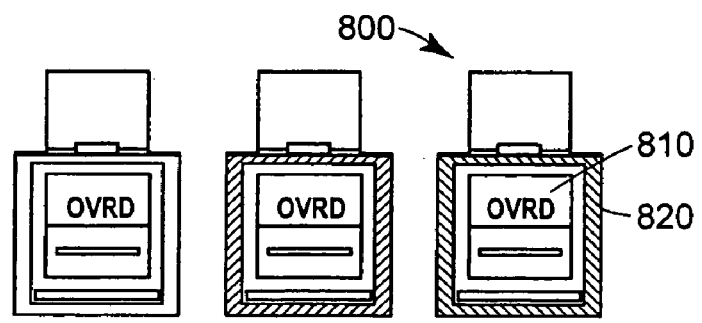
FIG. 8 is another example of surround lighting on an alternate action or momentary action switch.

FIG. 8 is an example of how an alternate action or momentary action type switch 800 may use surface lighting. The alternate action or momentary action switch 800 has a center portion 810 and a ringed portion 820. The ringed portion 820 may function in a similar manner as described above with respect to the switch and rotary dial. The ringed portion 820 may be lit in any color, depending on user preference, or use other means, for example flashing or blinking to identify the switch.

In any of the surface lighting examples above, the surface light may include, laser diodes, LED's, incandescent light bulbs, electroluminescent strips, or any other device which produces light. Additionally, the surface lighting need not completely surround the switch, lever, dial or control, but instead may only be located sufficiently near the switch or be integrated within the switch, lever, dial or control to properly identify it.

Although the preferred embodiments of the invention have been disclosed for illustrative purposes, those skilled in the art will appreciate that various modifications, additions and substitutions are possible, without departing from the scope and spirit of the invention as disclosed herein and in the accompanying claims. For example, the system may be adapted for use in any system which requires the use of a checklist, such as, for example, an aircraft, a ship, a space vehicle, an automobile, a truck, a train, a power generating facility, or any other vehicle, system or facility which uses checklists and/or manipulates switches, levers, dials and/or controls during normal or non-normal operations.

What is claimed is:

1. A checklist error mitigation system, for a vehicle comprising:
    a processor adapted to run a software program;
    an illumination device operatively connected to the processor;
    a memory accessible by the processor that includes the software program and a checklist; and
    a user interface through which a user controls and responds to the system;
    wherein the software program is adapted to determine if any one of a switch, lever, dial and/or a control requires manipulation to complete a checklist step; and
    wherein the processor is also adapted to instruct the illumination device to illuminate each switch, lever, dial or control requiring manipulation.

2. The system of claim 1, including more than one illumination device.

3. The system of claim 2, wherein the more than one illumination device is a spotlight.

4. The system of claim 2, wherein the more than one illumination device is a surface light.

5. The system of claim 4, wherein the surface light at least partially surrounds the one of a switch, lever, dial or control.

6. The system of claim 2, wherein at least one system provides an input to the processor.

7. The system of claim 6, wherein the input is indicative of the checklist step being completed.

8. The system of claim 7, wherein the one of a switch, lever, dial or control associated with a following checklist step is illuminated.

9. The system of claim 1, wherein the vehicle is an aircraft.

10. A method for mitigating errors during completion of a checklist, the method comprising:
    receiving a first input;
    determining a checklist step based on the first input;
    highlighting a switch, a lever, a dial and/or a control that requires manipulation for completion of the checklist step; and
    receiving a second input indicative of completion of the checklist step.

11. The method of claim 10, including highlighting a switch, a lever, a dial and/or a control requiring manipulation for completion of a second checklist step.

12. The method of claim 10, wherein the first input is received from a system.

13. The method of claim 10, wherein the first input is received from a user interface device.

14. The method of claim 10, wherein a spotlight highlights each switch, lever dial and/or control that requires manipulation.

15. The method of claim 10, wherein a surface light highlights each switch, lever, dial and/or control that requires manipulation.

16. The method of claim 15, wherein the surface light at least partially surrounds each switch, lever, dial and/or control that requires manipulation.

17. The method of claim 10, wherein the method is carried out in an aircraft.

18. A checklist error mitigation system comprising:
    a processor adapted to run a software program;
    an illumination device operatively connected to the processor;
    a memory accessible by the processor that includes the software program and a checklist; and
    wherein the software program determines if any one of a switch, lever, dial or control requires manipulation to complete a checklist step; and
    wherein the processor instructs the illumination device to illuminate the switch, lever, dial or control requiring manipulation.

19. The system of claim 18, including more than one illumination device.

20. The system of claim 19, wherein the more than one illumination device is a surface light.

21. The system of claim 20, wherein the surface light at least partially surrounds the one of a switch, lever, dial or control.

22. The system of claim 19, wherein at least one system provides an input to the processor.

23. The system of claim 22, wherein the input is indicative of the checklist step being completed.

24. The system of claim 23, wherein the one of a switch, lever, dial or control associated with a following checklist step is illuminated.

25. The system of claim 18, wherein the more than one illumination device is a spotlight.

* * * * *